Nov. 30, 1965 H. A. DI MARCO ETAL 3,220,950

HIGH IRON MAGNESIUM MANGANESE FERRITE

Filed Dec. 12, 1962

2 Sheets-Sheet 1

INVENTORS
HENRY A. DIMARCO
RICHARD D. DORION
EDGAR C. LEAYCRAFT

BY Bertram M. Mullin

ATTORNEY

United States Patent Office 3,220,950

Patented Nov. 30, 1965

3,220,950
HIGH IRON MAGNESIUM MANGANESE FERRITE

Henry A. Di Marco, Wappingers Falls, Richard D. Dorion, Poughkeepsie, and Edgar C. Leaycraft, Woodstock, N.Y., assignors to International Business Machines Corporation, New York, N.Y., a corporation of New York Filed Dec. 12, 1962, Ser. No. 244,100
7 Claims. (Cl. 252—62.5)

This invention relates to Mg-Mn ferrite ceramics of the square or rectangular hysteresis loop type, and, in particular, to a new rectangular hysteresis loop Mg-Mn ferrospinel ferrite compositional system.

Mg-Mn ferrites are widely employed as magnetic memory elements and pulse transfer controlling devices in computer and other information processing systems. These ferrites are generally synthesized by mixing selected constituent metallic oxides in predetermined proportions, processing the mixture to a ferrite powder by standard ceramic methods, pressing the powder into rigid shape and thereafter sintering the pressed material at a high temperature. The treatment causes the constituents to react and diffuse on an atomic scale to form a ferrospinel type of crystal structure having two stable states and a responsive excitation characteristic of a substantially rectangular hysteresis loop type.

Ferrites of this type are usually referred to as square-loop ferrites and are used to represent binary information. It is usual that these ferrites represent a binary "1" in one of the unbiased remanent states of magnetization and a binary "0" in the other of its unbiased remanent states of magnetization. The ferrite is switched from one remanent state to the other by applying a magnetizing force of appropriate direction and of sufficient magnitude to overcome the coercivity of the ferrites.

Although square-loop Mg-Mn ferrites are presently available in the art, they are relatively temperature sensitive and are limited in application to usage where temperature conditions are accurately controlled. Attempts have been made to raise the Curie temperature of the material to render the magnetic and electrical properties of the ferrite relatively insensitive to small variations of temperature, which may come about from the hysteresis losses, due to the operation of the computer or from the temperature of the surrounding ambients. One approach to this problem has been to incorporate higher amounts of the iron cation in the material, however, this has resulted in the deterioration of the square loop characteristics of the material, which characteristics are most desirable for coincident current memory applications. Accordingly, it has been a considerable object of research to provide a Mg-Mn ferrospinel ferrite having square loop characteristics which are relatively insensitive to small variations in temperature.

Accordingly, it is a primary object of this invention to provide a new square-loop Mg-Mn ferrospinel ferrite.

It is a further object of this invention to provide a Mg-Mn ferrite having improved magnetic properties.

It is still a further object of this invention to provide a Mg-Mn ferrospinel ferrite having square loop characteristics which are relatively insensitive to small variations in temperature.

It is yet another object of this invention to provide a new square loop Mg-Mn ferrospinel ferrite having a high proportion of the iron cation incorporated therein.

It is still a further object of the invention to provide a commercially feasible method for enhancing Mg-Mn ferrites having a high proportion of the iron cation incorporated therein with square loop characteristics which are relatively insensitive to small variations in temperature.

The foregoing and other objects, features and advantages of the invention will be apparent from the following more particular description of the preferred embodiments of the invention as illustrated in the accompanying drawings.

Figure 1:
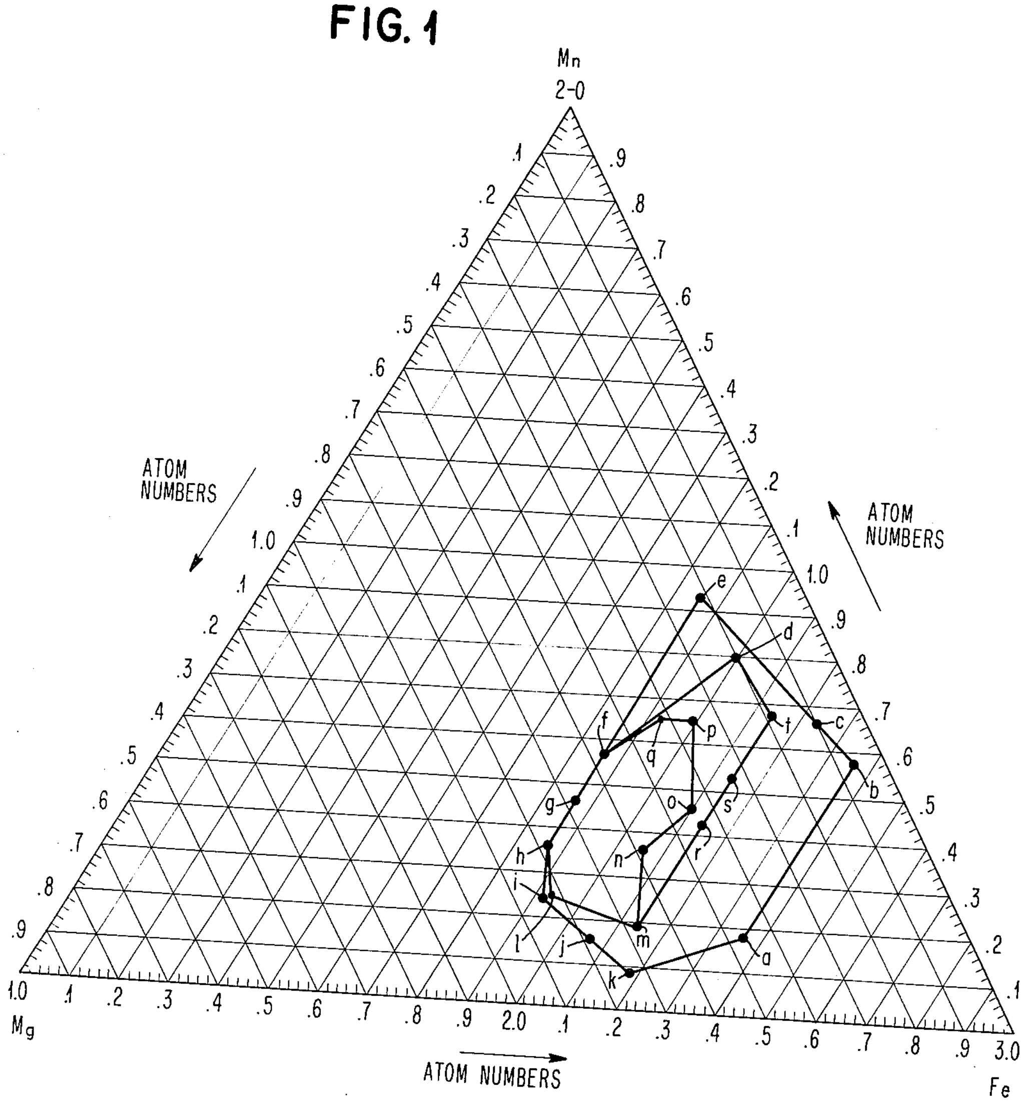
FIGURE 1 is a triaxial diagram for the ferrospinel ferrite compositional system Mg-Mn-Fe containing outlined areas of all compositions contemplated by the present invention.

Generally speaking, the present invention is based on the surprising discovery that a Mg-Mn ferrospinel ferrite having the composition represented by the formula:

$$Mg_xMn_yFe_{3-x-y}O_4$$

where *x* lies between 0.09 to 0.85
where *y* lies between 0.08 to 0.94
and 3-*x*-*y* is at least 1.86 and, falling within the area *a—b—c—e—f—g—h—i—j—k—a* of FIGURE 1 of the drawing, has square loop characteristics which are relatively insensitive to small variations in temperature. This is a most surprising discovery since it was previously though that the Mg-Mn ferrites containing a high proportion of the iron cation would exhibit inferior properties in comparison to Mg-Mn ferrites presently available. To the contrary, it has been found that ferrites from the ferrospinel compositional system heretofore defined not only have square loop characteristics, but have square loop characteristics which are relatively insensitive to small variations in temperature.. Accordingly, with a ferrite of the present invention, it is now possible to operate data processing and computer machines at much tigher temperatures than heretofore contemplated in the art.

In Table I below the data represented in the triaxial diagram of FIGURE 1 is presented along with the magnetic parameters examined for temperature sensitivity. In the table *Br/Bs* is the ratio of the remanent induction to the saturation induction at a drive of 6.1 oersteds. *Io* is the threshold current in milliamperes per degree centigrade, and the $H_c$ and the $uV_1$ parameters are given as the percentage change per degree centigrade.

TABLE I

*Composition (atom numbers)*

| Code No. | Fe | Mn | Mg | Br/Bs | $uV_1$/° C. | Io, ma./° C. | $H_c$/° C. | Point |
|---|---|---|---|---|---|---|---|---|
| 3 | 2.37 | 0.18 | 0.45 | 0.82 | ---------- | ---------- | 0.11 | *a* |
| 11 | 2.37 | 0.55 | 0.9 | 0.90 | ---------- | ---------- | 0.11 | *b* |
| 12 | 2.3 | 0.66 | 0.9 | 0.82 | ---------- | ---------- | 0.13 | *c* |
| 9 | 2.0 | 0.8 | 0.2 | 0.88 | 1.3 | 1.0 | -------- | *d* |
| 30 | 1.86 | 0.93 | 0.2 | 0.85 | 1.4 | 1.3 | -------- | *e* |
| 45 | 1.86 | 0.57 | 0.57 | 0.88 | 0.82 | 1.2 | -------- | *f* |
| 18 | 1.86 | 0.47 | 0.67 | 0.85 | 0.90 | 1.0 | -------- | *g* |
| 19 | 1.86 | 0.36 | 0.78 | 0.84 | 0.90 | 1.0 | -------- | *h* |
| 54 | 1.93 | 0.25 | 0.81 | 0.85 | 0.75 | 0.75 | -------- | *i* |
| 52 | 2.09 | 0.15 | 0.76 | 0.86 | ---------- | ---------- | 0.15 | *j* |
| 58 | 2.19 | 0.09 | 0.72 | 0.85 | ---------- | ---------- | 0.16 | *k* |
| 54 | 1.93 | 0.25 | 0.81 | 0.85 | 0.75 | 0.75 | -------- | *l* |
| 1 | 2.13 | 0.19 | 0.68 | 0.89 | 1.0 | 0.9 | -------- | *m* |
| 56 | 2.07 | 0.34 | 0.59 | 0.90 | 1.2 | 0.82 | -------- | *n* |
| 44 | 2.10 | 0.45 | 0.45 | 0.90 | 1.0 | 0.9 | -------- | *o* |
| 47 | 2.0 | 0.65 | 0.35 | 0.88 | 1.3 | 0.9 | -------- | *p* |
| 61 | 1.93 | 0.66 | 0.41 | 0.88 | .80 | 1.00 | -------- | *q* |
| 6 | 2.13 | 0.44 | 0.44 | 0.85 | 1.2 | 0.6 | -------- | *r* |
| 49 | 2.13 | 0.53 | 0.34 | 0.89 | 1.2 | 0.8 | -------- | *s* |
| 2 | 2.13 | 0.68 | 0.19 | 0.89 | 1.5 | 0.8 | -------- | *t* |

In Table I, the variance of the magnetic parameters $H_c$, $uV_1$ and I*o* with temperature is given. These parameters are most significant in evaluating temerature sensitivity in that:

$H_c$ is the coercive force of the ferrite material. As the knee of a memory core hysteresis loop increases and decreases with temperature the coercive force of the ferrite core does also. Accordingly, if $H_c$ is relatively insensitive to temperature, it is a good indication that the square loop characteristics are also.

The parameter of $uV_1$ is the undisturbed core response when a core is fully switched by a current sufficiently high to do so. The less this parameter varies with temperature, the less critical becomes sense amplifier design to sense low amplitude output and the wider the range of temperature over which the ferrite core output can be sensed.

The parameter I*o* of a ferrite is used to define the knee of the hysteresis loop. It is defined as the highest current which can be applied to the ferrite core without causing a rapid increase in the disturbed "0" response or a rapid decrease in the disturbed "1" response. The less the I*o* of a ferrite core material changes with temperature, the less critical becomes the close control over drive current fluctuation in a computer or the less drive current must be adjusted with temperature.

From Table I and FIGURE 1, it is seen that square loop Mg-Mn ferrites may be made from a Mg-Mn ferrospinel ferrite system in which the composition contains a high proportion of the iron cation. The compositions, as is heretofore stated, are represented by the formula:

$$Mg_xMn_yFe_{3-x-y}O_4$$

where $x$ lies between 0.09 to 0.85
where $y$ lies between 0.08 to 0.94
and $3-x-y$ is at least 1.86.

Ferrites having this formulation fall within area *a—b—c—e—f—g—h—i—j—k—a* of FIGURE 1 of the drawing. As has been brought out above, this area provides square loop ferrites which are relatively insensitive to temperature variation.

Within this broad area is included area *f—g—h—l—m—n—o—p—q—f*. The compositions encompassed by this area are represented by the formula:

$$Mg_xMn_yFe_{3-x-y}O_4$$

where $x$ lies between 0.38 to 0.82
where $y$ lies between 0.18 to 0.65
and $3-x-y$ is at least 1.86.

Compositions within this area are most suitable for computer application where extreme temperature insensitivity is required in the $uV_1$ response from the square loop ferrites.

In applications where drive current fluctuations with temperature become troublesome, compositions from the area *f—g—h—l—m—r—s—t—d—f* are most satisfactory. The compositions included by this area are represented by the formula:

$$Mg_xMn_yFe_{3-x-y}O_4$$

where $x$ lies between 0.20 to 0.82
where $y$ lies between 0.18 to 0.80
and $3-x-y$ is at least 1.86.

As heretofore stated it was previously believed that square loop Mg-Mn ferrites could not be produced with a high proportion of the iron cation included in the composition. What was not recognized in the art is that there is a critical range of compositions over which square loop characteristics are developed in Mg-Mn ferrites having a high proportion of the iron cation.

Figure 2:
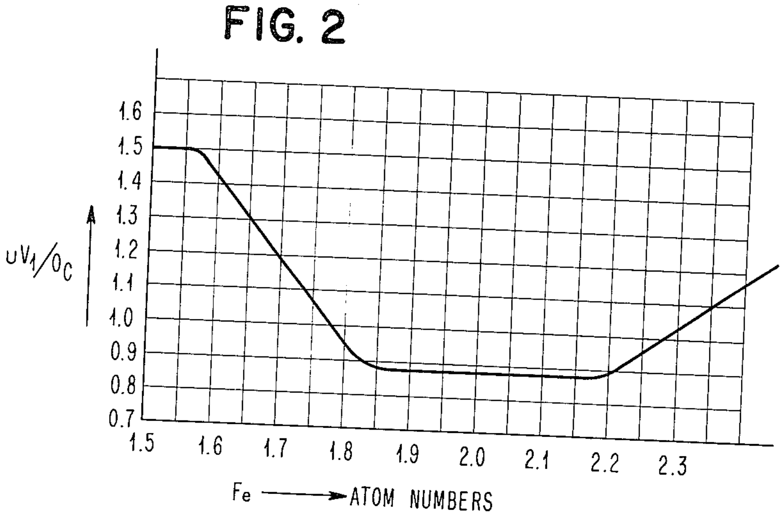
FIGURE 2 shows the variations of $uV_1$/° C. with iron content in the ferrospinel ferrite compositional system.

FIGURE 2 is a plot for $uV_1$/° C. versus the iron cation concentration for a composition having a constant ratio of magnesium and manganese. In this plot it is seen that beginning at about 1.86 atom numbers of the iron cation the magnetic parameter is relatively insensitive to temperature. The critical range extends from about 1.86 atom numbers of the iron cation to about 2.4 atom numbers.

Figure 3:
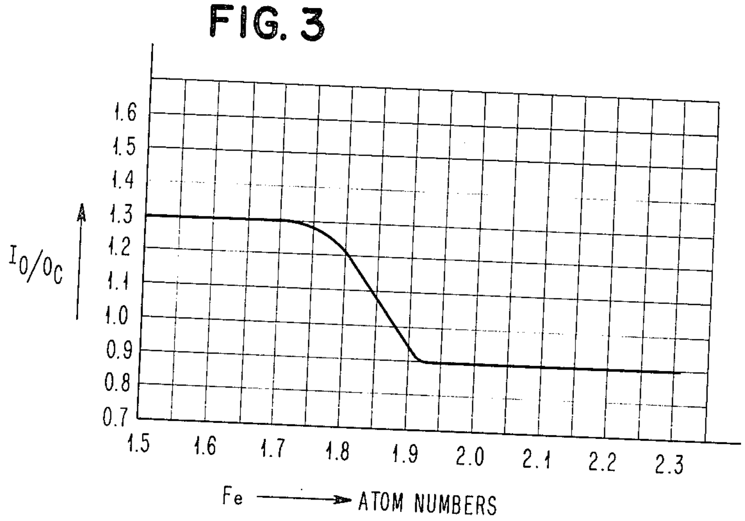
FIGURE 3 shows the variation of *Io*/° C. with the iron content for the ferrospinel ferrite compositional system.

Similarly from FIGURE 3 which contains a plot of I*o*/° C. versus the iron cation concentration, it is noted that I*o*/° C. is fairly high up to about 1.86 atom numbers of iron. From 1.86 to 1.95 atom numbers, the magnetic parameter falls within the acceptable range for temperature insensitivity, and, beginning at 1.95 atom numbers of iron, I*o*/° C. becomes relatively insensitive to temperature. From these graphs, it is seen that the ferrite composition giving the most preferred characteristics is represented by the formula:

$$Mg_xMn_yFe_{3-x-y}O_4$$

where $x$ lies between 0.49 to 0.85
where $y$ lies between 0.48 to 0.94
and $3-x-y$ is at least 1.95.

Ferrite cores are prepared from the ferrospinel composition system with standard ceramic techniques. $Fe_2O_3$, $MnCO_3$, and MgO, for example, are weighed out and mixed in a slurry in a ball mill.

Examples of the mixtures prepared are given in Table II below:

TABLE II

*Composition mol percent*

| Code No. | $Fe_2O_3$ | MnO | MgO |
|---|---|---|---|
| 3 | 65 | 10 | 25 |
| 11 | 65 | 30 | 5 |
| 12 | 60 | 35 | 5 |
| 9 | 50 | 40 | 10 |
| 30 | 45 | 45 | 10 |
| 45 | 45 | 27.5 | 27.5 |
| 18 | 45 | 22.5 | 32.5 |
| 19 | 45 | 18.5 | 37.5 |
| 54 | 47.5 | 12.5 | 40 |
| 52 | 53.5 | 7.5 | 39 |
| 58 | 57.5 | 5.0 | 37.5 |
| 54 | 47.5 | 12.5 | 40 |
| 1 | 55 | 10 | 35 |
| 56 | 52.5 | 17.5 | 30 |
| 44 | 54 | 23 | 23 |
| 47 | 50 | 32.5 | 17.5 |
| 61 | 47.5 | 32.5 | 20 |
| 6 | 55 | 22.5 | 22.5 |
| 49 | 55 | 27.5 | 17.5 |
| 2 | 55 | 35 | 10 |

The mixture is then calcined between 700° C. and 1000° C. A binder is incorporated into the resulting mixture, for example, 3% polyvinyl alcohol and the cores then pressed to densities of 2.5 to 4.0 gr. per cc. The mixture is then placed in a platinum boat and inserted in a furnace at a temperature in a range from 1100° to 1500° C. The material is left at the selected temperature for a time varying between 2 minutes and 4 hours, thereafter the material is cooled at the natural rate of the furnace to some lower temperature in the range between 850° C. to 1100° C. at which point the cores are removed from the furnace and quenched on a metal plate.

In order to obtain square loop cores and particularly square loop cores which are relatively insensitive to small variations in temperature in the Mg-Mn ferrospinel ferrite system, the use of the furnace cool or a soak time at a lower temperature is found to be essential. Without this process step, the cores are unusable for computer memory application. In the first technique mentioned, the boat and cores are left in the furnace which is then shut off and allowed to cool at its normal rate until some predetermined lower temperature is reached, at which temperature the cores are extracted from the furnace and quenched on a metal plate. In the second technique, two furnaces are utilized, or a multi-zone furnace. In the case of the two furnaces, the boat and the cores, at the completion of their high temperature soak down, are quickly transferred to a second furnace set at a lower temperature. They are left in the second furnace for a period of from 2 minutes to 3 hours, then metal plate quenched. In the case of the two zone furnace, the cores are given their high temperature firing, then the boat and cores are pushed through to another furnace zone set at some lower temperature, allowed to remain there for a period of from 2 minutes to 3 hours, and at the end of this period the boat is metal plate quenched. In all cases sintering is done in a normal ambient air atmosphere. It cannot be over-emphasized that the particular process steps recited above are most necessary in order to provide square loop characteristics in a high iron Mg-Mn ferrite.

What has been provided is a magnesium-manganese ferrospinel ferrite having a high proportion of the iron cation therein which has square loop characteristics which are accompanied by a relative insenitiveness to temperature. With the present invention it is possible to increase the operating range of a computer from a range of 10 to 70° C. to one from 0 to 120° C. This reduction in temperature sensitivity makes it possible to provide highly complicated memory arrays which are utilizable in areas of high heat and also makes for more reliable systems for use in the increased adverse temperature environment.

While there have been shown and described and pointed out the fundamental novel features of the invention as applied to preferred embodiments, it will be understood that various omissions and substitutions and changes in the form and details of the invention illustrated and in its operation may be made by those skilled in the art without departing from the spirit of the invention. It is the intention thereof to be limited only as indicated by the scope of the following claims.

What is claimed is:

1. A ferrospinel ferrite having a rectangular hysteresis loop, the ferrite composition consisting essentially of magnesium, manganese, iron and oxygen in the proportions as represented by the formula:

$$Mg_xMn_yFe_{3-x-y}O_4$$

where $x$ lies between 0.09 to 0.85
where $y$ lies between 0.08 to 0.94
where $3-x-y$ is at least 1.86
and where said composition falls within the area $a$—$b$—$c$—$e$—$f$—$g$—$h$—$i$—$j$—$i$—$a$ of FIGURE 1 of the drawing.

2. A ferrospinel ferrite having a rectangular hysteresis loop, the ferrite composition consisting essentially of magnesium, manganese, iron and oxygen in the proportions as represented by the formula:

$$Mg_xMn_yFe_{3-x-y}O_4$$

where $x$ lies between 0.38 to 0.82
where $y$ lies between 0.18 to 0.65
where $3-x-y$ is at least 1.86
and where said composition falls within the area $f$—$g$—$h$—$l$—$m$—$n$—$o$—$p$—$q$—$f$ of FIGURE 1 of the drawing.

3. A ferrospinel ferrite having a rectangular hysteresis loop, the ferrite composition consisting essentially of magnesium, manganese, iron and oxygen in the proportions as represented by the formula:

$$Mg_xMn_yFe_{3-x-y}O_4$$

where $x$ lies between 0.20 to 0.82
where $y$ lies between 0.18 to 0.80
where $3-x-y$ is at least 1.86
and where said composition falls within the area $f$—$g$—$h$—$l$—$m$—$r$—$s$—$t$—$d$—$f$ of FIGURE 1 of the drawing.

4. A ferrospinel ferrite having a rectangular hysteresis loop, the ferrite composition consisting essentially of magnesium, manganese, iron and oxygen in the proportions as represented by the formula:

$$Mg_xMn_yFe_{3-x-y}O_4$$

where $x$ lies between 0.09 to 0.85
where $y$ lies between 0.08 to 0.94
where $3-x-y$ is at least 1.95
and where said composition falls within the area $f$—$g$—$h$—$i$—$j$—$k$—$a$—$b$—$c$—$e$—$f$ of FIGURE 1 of the drawing.

5. A ferrospinel ferrite having a rectangular hysteresis loop, the ferrite composition consisting essentially of magnesium, manganese, iron and oxygen in the proportions as represented by the formula:

$$Mg_xMn_yFe_{3-x-y}O_4$$

where $x$ lies between 0.49 to 0.85
where $y$ lies between 0.48 to 0.94
where $3-x-y$ is at least 1.95
and where said composition falls within the area $f$—$g$—$h$—$l$—$j$—$k$—$a$—$b$—$c$—$e$—$f$ of FIGURE 1 of the drawing.

6. The method of forming a ferrospinel ferrite with a rectangular hysteresis loop where the ferrite composition consists essentially of magnesium, manganese, iron and oxygen in the proportions as represented by the formula:

$$Mg_xMn_yFe_{3-x-y}O_4$$

where $x$ lies between 0.09 to 0.85
where $y$ lies between 0.08 to 0.94
where $3-x-y$ is at least 1.86 said method comprising the step of:

heating a ferrite mixture having the composition as represented by said formula at a temperature in the range between 1100° C. to 1500° C. for a selected period of time in an air atmosphere;

reducing the temperature about said mixture until a second temperature in the range between 850° C. to 1100° C. is reached and, thereafter, rapidly quenching said mixture from said second temperature to room temperature.

7. The method of forming a ferrospinel ferrite with a rectangular hysteresis loop where the ferrite composition consists essentially of magnesium, manganese, iron and oxygen in the proportions as represented by the formula:

$$Mg_xMn_yFe_{3-x-y}O_4$$

where $x$ lies between 0.38 to 0.82
where $y$ lies between 0.18 to 0.65
where $3-x-y$ is at least 1.86 said method comprising the steps of:

heating a ferrite mixture having the composition as represented by said formula at a temperature in the the range between 1100° C. to 1500° C. for a selected period of time in an air atmosphere;

slowly cooling said mixture to a second temperature in the range between 850° C. to 1100° C. and thereafter, rapidly quenching said mixture from said second temperature to room temperature.

References Cited by the Examiner

UNITED STATES PATENTS

| | | | |
|---|---|---|---|
| 3,065,182 | 11/1962 | Aghajanian | 252—62.5 |
| 3,072,576 | 1/1963 | Greenhouse | 252—62.5 |

FOREIGN PATENTS

| | | |
|---|---|---|
| 167,499 | 4/1956 | Australia. |
| 789,099 | 1/1958 | Great Britain. |

TOBIAS E. LEVOW, *Primary Examiner.*

MAURICE A. BRINDISI, *Examiner.*